United States Patent
Abe et al.

(10) Patent No.: US 11,930,335 B2
(45) Date of Patent: Mar. 12, 2024

(54) CONTROL DEVICE, CONTROL METHOD, AND CONTROL PROGRAM

(71) Applicant: TOYOTA BOSHOKU KABUSHIKI KAISHA, Aichi-ken (JP)

(72) Inventors: Hiroki Abe, Aichi (JP); Yuki Kamiya, Aichi (JP); Osamu Kawase, Aichi (JP); Yasuhiro Ishiguro, Aichi (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 147 days.

(21) Appl. No.: 17/831,998

(22) Filed: Jun. 3, 2022

(65) Prior Publication Data

US 2022/0400343 A1 Dec. 15, 2022

(30) Foreign Application Priority Data

Jun. 10, 2021 (JP) .................. 2021-097370

(51) Int. Cl.
| | |
|---|---|
| H04B 3/00 | (2006.01) |
| G06F 3/16 | (2006.01) |
| G06V 20/40 | (2022.01) |
| G06V 40/20 | (2022.01) |
| G10L 17/22 | (2013.01) |
| H04R 1/40 | (2006.01) |
| H04R 3/12 | (2006.01) |
| H04R 29/00 | (2006.01) |
| H04B 1/00 | (2006.01) |

(52) U.S. Cl.
CPC ............... *H04R 3/12* (2013.01); *G06F 3/165* (2013.01); *G06V 20/41* (2022.01); *G06V 40/20* (2022.01); *G10L 17/22* (2013.01); *H04R 1/403* (2013.01); *H04R 29/002* (2013.01); *H04R 2499/11* (2013.01)

(58) Field of Classification Search
CPC ........ H04R 3/12; H04R 1/403; H04R 29/002; H04R 2499/11; G06V 20/41; G06V 40/20; G06F 3/165; G10L 17/22
USPC .................................................... 381/77, 86
See application file for complete search history.

(56) References Cited

U.S. PATENT DOCUMENTS 10,999,419 B1 * 5/2021 Willis ..................... G06F 16/68

FOREIGN PATENT DOCUMENTS

JP 2009-147814 7/2009

* cited by examiner

*Primary Examiner* — Ammar T Hamid
(74) *Attorney, Agent, or Firm* — Greenblum & Bernstein, P.L.C.

(57) ABSTRACT

The control device includes: a detection unit that detects a predetermined speech/motion of a user who is present in an output destination space of a directional speaker; an identification unit that identifies, in accordance with the predetermined speech/motion, an audio source of interest among audio sources and a directional speaker as an object to be controlled; and an output control unit that causes the identified directional speakers to output audio supplied from the identified audio source.

20 Claims, 7 Drawing Sheets

| SPEAKER | AUDIO SOURCE | SHARING CONTROL | PRE-SHARING AUDIO SOURCE |
|---|---|---|---|
| 3A | 2A (ON-VEHICLE RADIO) | 0 | — |
| 3B | 2B (PORTABLE GAMING MACHINE) | 0 | — |
| 3C | 2C (SMART PHONE) | 0 | — |
| 3D | 2D (SMART PHONE) | 0 | — |

161B

| SPEAKER | AUDIO SOURCE | SHARING CONTROL | PRE-SHARING AUDIO SOURCE |
|---|---|---|---|
| 3A | 2A (ON-VEHICLE RADIO) | 0 | — |
| 3B | 2B (PORTABLE GAMING MACHINE) | 0 | — |
| 3C | 2D (SMART PHONE) | 1 | 2C (SMART PHONE) |
| 3D | 2D (SMART PHONE) | 0 | 2D (SMART PHONE) |

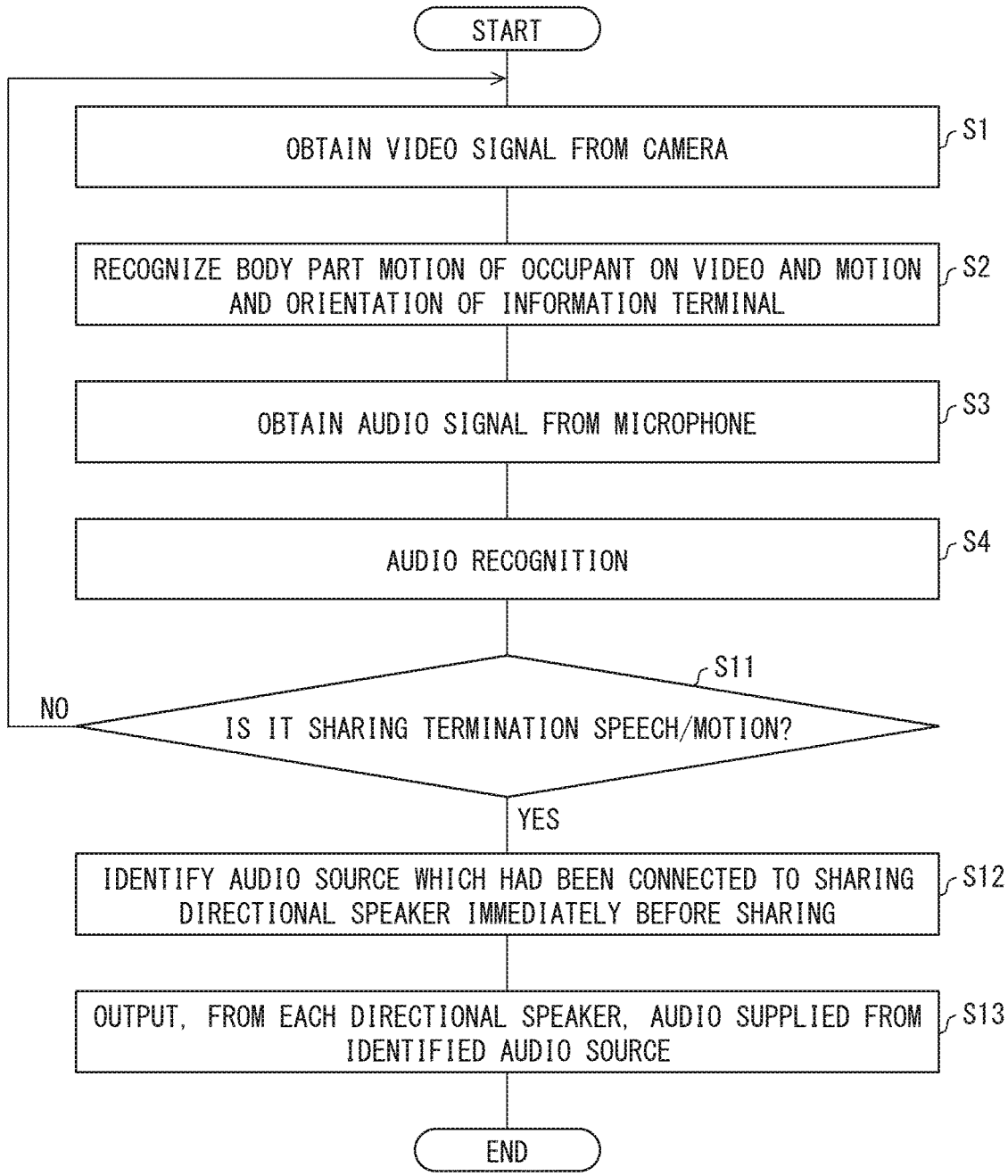

CONTROL DEVICE, CONTROL METHOD, AND CONTROL PROGRAM

This Nonprovisional application claims priority under 35 U.S.C. § 119 on Patent Application No. 2021-097370 filed in Japan on Jun. 10, 2021, the entire contents of which are hereby incorporated by reference.

TECHNICAL FIELD

The present invention relates to a control device and the like which cause audio output devices to output audio that is supplied from an audio source.

BACKGROUND ART

There is a technique of allowing a plurality of users present in a predetermined space to listen to different pieces of audio by causing a plurality of audio output devices provided in the predetermined space to output respective pieces of audio supplied from different audio sources. One example of such a technique is to provide directional speakers in respective seats in a vehicle and allow occupants sitting on the respective seats to listen to pieces of audio supplied from different audio sources.

Patent Literature 1 discloses a technique of sharing one audio source by a plurality of audio output devices on the basis of such a technique. Specifically, Patent Literature 1 discloses a technique of selecting a plurality of seats in a vehicle by operating a graphical user interface displayed on a touch panel, and sharing one audio source by speakers that are provided in the plurality of seats, respectively.

CITATION LIST

Patent Literature

[Patent Literature 1]
Japanese Patent Application Publication Tokukai No. 2009-147814

SUMMARY OF INVENTION

Technical Problem

In the technique of Patent Literature 1, it is necessary to carry out an input operation with respect to the graphical user interface in order to share the audio source. However, it is troublesome for a user, who is accustomed to sharing a video or the like by, for example, bringing a screen of a smart phone closer to a companion, to carry out the input operation every time the audio source is shared.

Moreover, according to the technique of Patent Literature 1, it is necessary to provide a screen for displaying the graphical user interface.

An object of an aspect of the present invention is to share audio between a plurality of users without carrying out an input operation.

Solution to Problem

In order to attain the object, a control device in accordance with an aspect 1 of the present invention is a control device for causing a plurality of audio output devices to output audio supplied from any of one or more audio sources, each of the one or more audio sources being set for each of the plurality of audio output devices, the control device including: a detection unit that detects a predetermined speech/motion of a user who is present in an output destination space of any of the plurality of audio output devices; an identification unit that identifies, in accordance with the predetermined speech/motion which has been detected, an audio source of interest among the one or more audio sources and one or more audio output devices as an object to be controlled among the plurality of audio output devices; and an output control unit that causes each of the one or more audio output devices which have been identified to output audio supplied from the audio source of interest which has been identified.

According to the configuration, an audio source of interest and an audio output device to be controlled are identified in accordance with the predetermined speech/motion of the user, and audio supplied from the audio source of interest is outputted from the identified audio output device. That is, when the user has carried out the predetermined speech/motion, audio supplied from the audio source of interest is outputted from an audio output device for which the audio source of interest is set and from the audio output device to be controlled. This allows the user to share audio supplied from the audio source with others in a simple manner in which the user only carries out the predetermined speech/motion.

In the control device in accordance with an aspect 2 of the present invention, it is possible in the aspect 1 that the detection unit detects, from an image captured by an imaging device, a predetermined action of the user as the predetermined speech/motion.

According to the configuration, a predetermined action of the user is imaged, and this predetermined action is detected as the predetermined speech/motion. This allows the user to share audio supplied from the audio source with others only by carrying out the predetermined action. For example, audio supplied from the audio source can be shared with others by a simple gesture, which is determined in advance as the predetermined action.

In the control device in accordance with an aspect 3 of the present invention, it is possible in the aspect 2 that the detection unit detects the predetermined action on the basis of a motion of a body part of the user included in the image.

According to the configuration, the predetermined action is detected from the motion of the user's body part which has been imaged. Therefore, the user can share audio that the user is listening to with others by moving a predetermined part of the user. Here, the motion of the body part includes, for example, a motion of an eye (in other words, a motion of a line of sight), as well as a motion of an arm or a hand.

In the control device in accordance with an aspect 4 of the present invention, it is possible in the aspect 3 that: the motion of the body part includes a motion of moving a position of an information terminal, which operates as an audio source, along a predetermined path; and the identification unit identifies the information terminal as the audio source of interest.

According to the configuration, audio supplied from the audio source is shared among a plurality of users by the motion of moving the position of the information terminal, which operates as the audio source, along the predetermined path. The predetermined path does not need to be complex and can be, typically, a simple path from a source user to a destination user who is to share the audio. Therefore, the user can share audio supplied from the audio source with others by a simple action.

In the control device in accordance with an aspect 5 of the present invention, it is possible in the aspect 4 that: the predetermined path is a path along which the information terminal is moved from a side of a user who is present in an output destination space of an audio output device for which the information terminal is set as an audio source to a side of a user who is present in an output destination space of an audio output device for which the information terminal is not set as an audio source; and the identification unit identifies the audio output device, for which the information terminal is not set as an audio source, as the object to be controlled.

According to the configuration, audio supplied from the information terminal operating as an audio source is outputted from an audio output device, which is used by another user to listen to another piece of audio, by the motion of bringing the information terminal closer to that another user, and thus audio sharing is achieved.

In the control device in accordance with an aspect 6 of the present invention, it is possible in the aspect 5 that: the detection unit detects a line of sight of the user toward which the information terminal has been moved; in a case where the line of sight is directed to the information terminal, the identification unit identifies the audio source of interest and the object to be controlled; and in a case where the line of sight is not directed to the information terminal, the identification unit does not identify the audio source of interest and the object to be controlled.

According to the configuration, audio supplied from an audio source is outputted from an audio output device, which is used by another user to listen to another piece of audio, when that another user looks at the approaching information terminal, and thus audio sharing is achieved. As such, audio sharing can be achieved by a series of actions that are normally carried out when audio sharing offered by a user is approved by another user. Therefore, users can naturally achieve audio sharing. In addition, audio sharing is not carried out unless another user looks at the information terminal, and this makes it possible to prevent audio sharing which is not desired by that another user.

In the control device in accordance with an aspect 7 of the present invention, it is possible in any of the aspects 1 through 4 that the detection unit detects, from audio inputted into an audio input device, a predetermined utterance given by the user as the predetermined speech/motion.

According to the configuration, a predetermined utterance of the user is obtained, and this predetermined utterance is detected as the predetermined speech/motion. This allows the user to share audio supplied from the audio source with others only by giving the predetermined utterance. For example, audio supplied from the audio source can be shared with others when an utterance containing a simple term is given, which is determined in advance as the predetermined utterance.

In the control device in accordance with an aspect 8 of the present invention, it is possible in the aspect 7 that: the predetermined utterance includes an intention to provide an audio source; the detection unit detects, after the predetermined utterance has been given, a speech/motion of a second user who is different from the user who has given the predetermined utterance; in a case where the speech/motion is affirmative, the identification unit identifies, as the audio source of interest, an audio source of audio that is outputted to a space in which the user who has given the predetermined utterance is present, and the identification unit at least identifies, as the object to be controlled, an audio output device that outputs audio to a space in which the second user is present; and in a case where the speech/motion is negative, the identification unit does not identify the audio source of interest and the object to be controlled.

According to the configuration, in a case where the user gives an utterance for indicating intention to provide an audio source, i.e., for offering audio sharing, and then the second user carries out an affirmative speech/motion, audio sharing between these two users is achieved. This allows two users to share audio supplied from an audio source by interaction that is carried out when sharing audio supplied from a single audio source. In addition, if the second user carries out a negative speech/motion, audio sharing is not carried out, and this makes it possible to prevent audio sharing that is not desired by the second user.

In the control device in accordance with an aspect 9 of the present invention, it is possible in the aspect 7 or 8 that: the predetermined utterance includes a request for enjoyment of an audio source; the detection unit detects, after the predetermined utterance has been given, a speech/motion of a third user who is different from the user who has given the predetermined utterance; in a case where the speech/motion is affirmative, the identification unit identifies, as the audio source of interest, an audio source of audio that is outputted to a space in which the third user is present, and the identification unit at least identifies, as the object to be controlled, an audio output device that outputs audio to a space in which the user who has given the predetermined utterance is present; and in a case where the speech/motion is negative, the identification unit does not identify the audio source of interest and the object to be controlled.

According to the configuration, in a case where the user gives an utterance for indicating a request for enjoyment of an audio source, i.e., for requesting audio sharing, and then the third user carries out an affirmative speech/motion, audio sharing between these two users is achieved. This allows two users to share audio supplied from an audio source by interaction that is carried out when sharing audio supplied from a single audio source. In addition, if the third user carries out a negative speech/motion, audio sharing is not carried out, and this makes it possible to prevent audio sharing that is not desired by the third user.

In the control device in accordance with an aspect 10 of the present invention, it is possible in any of the aspects 1 through 9 that: the detection unit detects a second predetermined speech/motion of the user, the second predetermined speech/motion being different from the predetermined speech/motion and indicating termination; and in a case where the second predetermined speech/motion has been detected, the output control unit causes the one or more audio output devices which have been identified to terminate output of audio supplied from the audio source of interest which has been identified.

According to the configuration, output of audio, which is supplied from the identified audio source, from the identified audio output devices is terminated in response to the second predetermined speech/motion of the user. This allows users who are sharing audio to terminate the audio sharing only by carrying out the second predetermined speech/motion. Therefore, audio sharing can be terminated without an input operation by the user.

In the control device in accordance with an aspect 11 of the present invention, it is possible in the aspect 10 that, in accordance with the termination, the output control unit resets an audio source, which had been set immediately before initiation of control by the output control unit, for each of the one or more audio output devices which have been identified.

According to the configuration, in accordance with the termination of audio sharing, the audio source, which had been set immediately before the initiation of control by the output control unit, is reset for an audio output device which had been an object to be controlled. This allows the user who was sharing audio to listen to, upon the termination of the audio sharing, audio that the user had been listening to before the audio sharing.

In the control device in accordance with an aspect 12 of the present invention, it is possible in any of the aspects 1 through 11 that: each of the plurality of audio output devices has directivity in a direction in which audio is emitted; and the plurality of audio output devices are arranged such that no sound field is formed by pieces of audio outputted and reached from the plurality of audio output devices which are different from each other.

According to the configuration, no sound field is formed by a plurality of pieces of audio outputted and reached from different audio output devices in the output destination space of the audio output device. Thus, a user in any one of formed sound fields is to listen to audio outputted from any one of the audio output devices. If a user wants to listen to audio that is different from that the user is listening to, the user in one of formed sound fields may need to move to another sound field. However, according to the foregoing configuration, when the user has carried out the predetermined speech/motion, audio supplied from the audio source of interest is outputted from an audio output device for which the audio source is set and from an audio output device to be controlled. This allows the user to listen to audio reaching another sound field by carrying out the predetermined speech/motion, without moving to that another sound field formed by the audio supplied and reached from the audio source of interest.

A method for controlling audio output in accordance with an aspect 13 of the present invention is a method for controlling audio output by a control device that causes a plurality of audio output devices to output audio supplied from any of one or more audio sources, each of the one or more audio sources being set for each of the plurality of audio output devices, the method including the steps of: detecting a predetermined speech/motion of a user who is present in an output destination space of any of the plurality of audio output devices; identifying, in accordance with the predetermined speech/motion which has been detected, an audio source of interest among the one or more audio sources and one or more audio output devices as an object to be controlled among the plurality of audio output devices; and causing each of the one or more audio output devices which have been identified to output audio supplied from the audio source of interest which has been identified.

The above configuration brings about an effect similar to that of the control device in accordance with the aspect 1.

The control device in accordance with each of the aspects of the present invention can be realized by a computer. In such a case, the present invention encompasses (i) a control program of the control device which causes the computer to serve as the units (software elements) included in the control device for realizing the control device and (ii) a computer-readable storage medium storing the control program.

Advantageous Effects of Invention

According to an aspect of the present invention, a plurality of users can share audio without carrying out an input operation.

BRIEF DESCRIPTION OF DRAWINGS

FIG. 3 is a diagram illustrating a specific example of an audio source setting stored in the control device illustrated in FIG. 1.

FIG. 8 is a flowchart showing an example of a flow of a sharing termination process carried out by a control device in accordance with Embodiment 2 of the present invention.

DESCRIPTION OF EMBODIMENTS

Embodiment 1

The following description will discuss an embodiment of the present invention in detail.

(Outline of Audio Output System)

Figure 1:
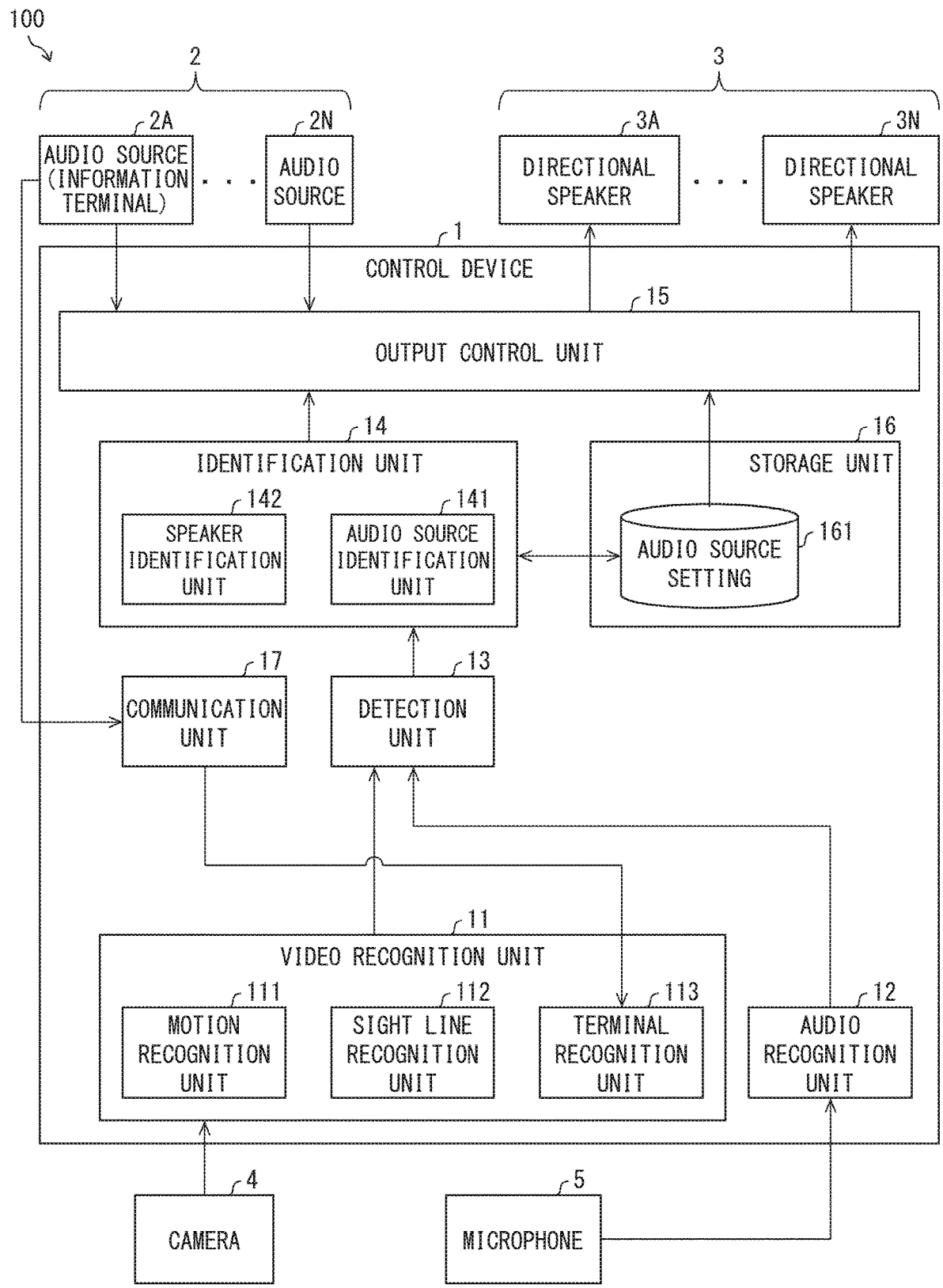
FIG. 1 is a diagram illustrating an example of a main part configuration of a control device included in an audio output system in accordance with Embodiment 1 of the present invention.

FIG. 1 is a diagram illustrating an example of a main part configuration of a control device 1 included in an audio output system 100 in accordance with Embodiment 1. The audio output system 100 is a system for outputting audio in a predetermined space.

As illustrated in FIG. 1, the audio output system 100 includes the control device 1, audio sources 2A through 2N, directional speakers 3A through 3N (audio output device), a camera 4 (imaging device), and a microphone 5 (audio input device).

The directional speakers 3A through 3N are a plurality of audio output devices that output audio in a predetermined space. The notation "3A through 3N" indicates that the number of the directional speakers is two or more, and this notation is not intended to limit the number of directional speakers included in the audio output system 100. Hereinafter, when the directional speakers 3A through 3N are not distinguished from each other, each of the directional speakers 3A through 3N is referred to as "directional speaker 3". The directional speaker 3 is an audio output device having directivity in a direction in which audio is emitted. The directional speakers 3A through 3N are arranged in a predetermined space such that no sound field is formed by pieces of outputted and reached audio. That is, a user present in the predetermined space is to listen to audio that is outputted from any one of the directional speakers 3.

In Embodiment 1, an audio output device having a function of allowing each user to listening to audio is exemplified by the directional speaker 3. However, instead of the directional speaker 3, another audio output device having such a function can be employed.

The audio sources 2A through 2N are a plurality of audio output devices that supply audio. The notation "2A through 2N" indicates that the number of the audio sources is two or more, and this notation is not intended to limit the number of audio sources included in the audio output system 100. The number of audio sources included in the audio output system 100 can be one. Hereinafter, when the audio sources 2A through 2N are not distinguished from each other, each of the audio sources 2A through 2N is referred to as "audio source 2". Each of the audio sources 2A through 2N is set for one of the plurality of directional speakers 3A through 3N. Specifically, each of the audio sources 2A through 2N is wired to or wirelessly connected to any of the plurality of directional speakers 3A through 3N via the control device 1. Thus, audio supplied from the audio source 2 is outputted from a directional speaker 3 connected to the audio source 2 via the control device 1. In Embodiment 1, it is assumed that the audio source 2 and the control device 1, and the control device 1 and the directional speaker 3 are, for example, wirelessly connected by using Bluetooth (registered trademark). The connection means is not limited to Bluetooth, and can be another wireless connection such as WiFi (registered trademark), or can be wired connection.

As described above, the directional speakers 3A through 3N are arranged in a predetermined space such that no sound field is formed by pieces of outputted and reached audio. Therefore, a user who wants to listen to audio supplied from a certain audio source 2 usually needs to be present in a sound field that is formed by audio reached from a directional speaker 3 for which the certain audio source 2 is set.

The audio source 2 can be an information terminal which can be brought into the predetermined space, or can be an audio source which is installed in advance in the predetermined space. Specific examples of the information terminal include, but are not limited to, a smart phone, a tablet terminal, a laptop computer, a portable gaming machine, a portable music player, a portable DVD player, and a portable Blu-ray Disc player. In the example of FIG. 1, at least the audio source 2A is illustrated as an information terminal.

The camera 4 is an imaging device that captures images in the predetermined space. The camera 4 transmits data of a captured image (typically, a video) to the control device 1.

The microphone 5 is an audio input device that obtains audio emitted in the predetermined space. The microphone 5 converts the obtained audio into an audio signal, and transmits the audio signal to the control device 1. Hereinafter, obtainment of audio by the microphone 5 is sometimes referred to as "sound collection".

The control device 1 controls audio output in the predetermined space. Specifically, the control device 1 sets, for each of the audio sources 2A through 2N, any of the directional speakers 3A through 3N, and causes audio, which is supplied from each of the audio sources 2A through 2N, to be outputted from the set directional speaker 3. For example, the control device 1 receives, from an audio source 2, a signal for pairing with one of the directional speakers 3A through 3N, and sets the audio source 2, which has transmitted the signal, for a directional speaker 3 indicated by the signal. The control device 1 receives audio data from the audio source 2, and transmits the audio data to the directional speaker 3 for which the audio source 2 is set. Thus, the control device 1 causes audio supplied from the audio source 2 to be outputted from the directional speaker 3 for which the audio source 2 is set.

The control device 1 detects a predetermined speech/motion of a user present in the predetermined space, identifies an audio source of interest among the audio sources 2A through 2N and directional speakers 3 to be controlled among the directional speakers 3A through 3N in accordance with the predetermined speech/motion, and causes audio supplied from the identified audio source to be outputted from each of the identified directional speakers 3. That is, the control device 1 causes audio supplied from the audio source 2, which has been identified based on the predetermined speech/motion of the user, to be outputted not only from a directional speaker 3 for which the audio source 2 is set but also from directional speakers 3 identified based on the predetermined speech/motion. In other words, based on the predetermined speech/motion by the user, the control device 1 can allow audio supplied from the audio source 2, which has been identified, to be shared among a plurality of users present in different output destination spaces. Hereafter, such a predetermined speech/motion is referred to as "sharing initiation speech/motion".

Here, the sharing initiation speech/motion is constituted by at least one of a predetermined action carried out by the user and a predetermined utterance made by the user. Typical examples of the predetermined action include, but are not limited to, actions by body parts such as a face, an eye (line of sight), an arm, a hand, and the like. In Embodiment 1, it is assumed that the sharing initiation speech/motion is speeches/motions carried out by at least two users. Typically, the sharing initiation speech/motion in accordance with Embodiment 1 is a speech/motion which is carried out, in response to a speech/motion by a certain user for initiating sharing of audio, by another user for accepting the sharing of audio. Hereinafter, the user who has carried out the speech/motion for initiating sharing of audio is sometimes referred to as "user who has initiated a sharing initiation speech/motion". Moreover, the user who has carried out the speech/motion for accepting sharing of audio is sometimes referred to as "user who has established the sharing initiation speech/motion". Details of the control device 1 will be described later.

With the configuration above, the control device 1 can allow a plurality of users to share audio supplied from one audio source 2 in accordance with a sharing initiation speech/motion carried out by the users. That is, a user who wants to share audio supplied from one audio source 2 can share the audio by carrying out the sharing initiation speech/motion without carrying out an input operation with respect to a user interface for audio sharing (e.g., a button operation with respect to the audio source 2 or the directional speaker 3). In other words, the user can share audio with a simple manner without feeling troublesomeness of an input operation.

(Application Example of Audio Input System)

Figure 2:
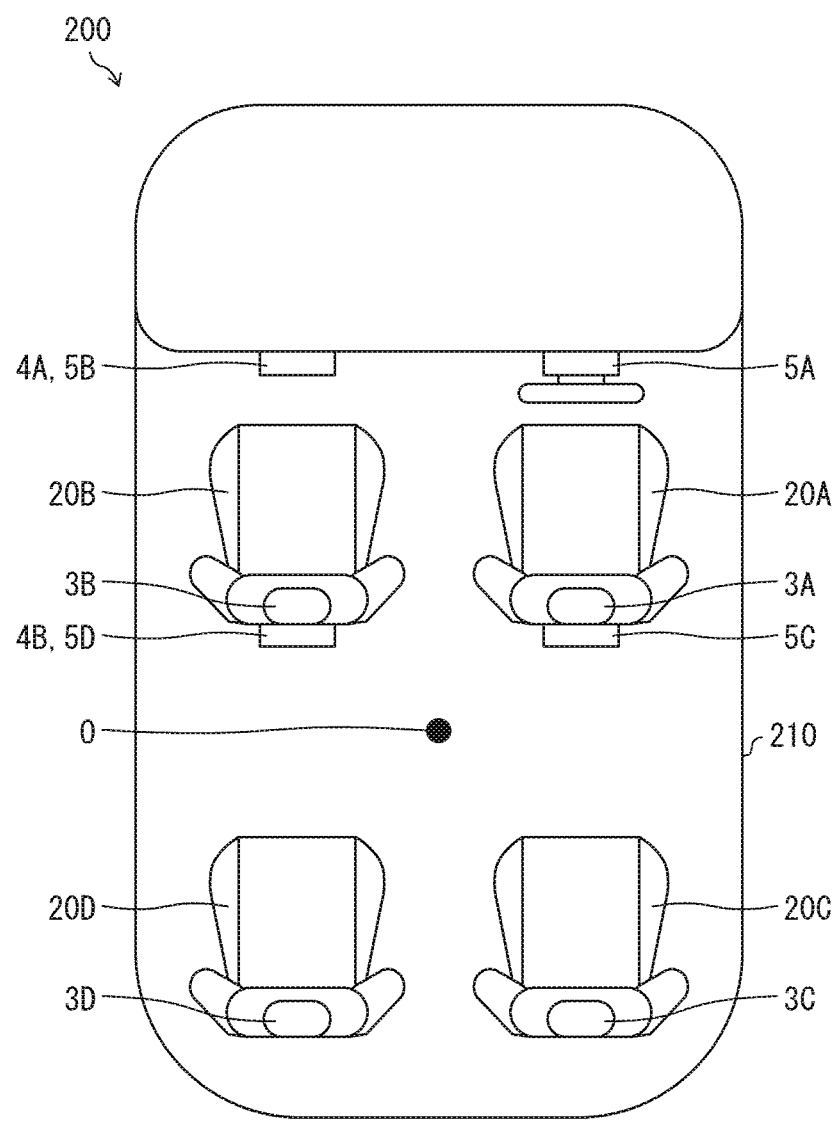
FIG. 2 is a top view of a vehicle to which the audio output system illustrated in FIG. 1 is applied.

FIG. 2 is a top view of a vehicle 200 to which the audio output system 100 is applied. That is, in an example illustrated in FIG. 2, the predetermined space is a vehicle space 210 formed in the vehicle 200.

As illustrated in FIG. 2, the vehicle space 210 is provided with four directional speakers 3A through 3D. In the example illustrated in FIG. 2, the directional speakers 3A through 3D are provided in respective headrests of seats. Specifically, the directional speaker 3A is provided in a headrest of a driver's seat 20A. The directional speaker 3B is provided in a headrest of a passenger's seat 20B. The directional speaker 3C is provided in a headrest of a rear seat 20C. The directional speaker 3D is provided in a headrest of a rear seat 20D.

Each of the directional speakers 3A through 3D has directivity in a direction in which audio is emitted so that only an occupant sitting on a seat, on which that directional speaker 3 is provided, can listen to the outputted audio. Specifically, intensity of a sound wave outputted from each of the directional speakers 3A through 3D is stronger in a forward direction of the vehicle 200 and is weaker in the other directions. With the configuration, audio outputted from the directional speaker 3A can only be listened to by an occupant (i.e., a driver) sitting on the driver's seat 20A. Audio outputted from the directional speaker 3B can only be listened to by an occupant sitting on the passenger's seat 20B. Audio outputted from the directional speaker 3C can only be listened to by an occupant sitting on the rear seat 20C. Audio outputted from the directional speaker 3D can only be listened to by an occupant sitting on the rear seat 20D. By arranging the directional speakers 3 in this manner, the occupants of the vehicle 200 can listen to a piece of audio that each of the occupants wants to listen to.

Note that the number of and installation positions of the directional speakers 3 provided in the vehicle space 210 are not limited to the example of FIG. 2.

As illustrated in FIG. 2, the vehicle space 210 is provided with two cameras 4A and 4B and four microphones 5A through 5D. In the example illustrated in FIG. 2, the camera 4A is located near a glove box in front of the passenger's seat 20B, and images the driver's seat 20A and the passenger's seat 20B. Thus, the occupants sitting on the driver's seat 20A and the passenger's seat 20B are imaged by the camera 4A. The camera 4B is provided on a back side of the passenger's seat 20B and images the rear seats 20C and 20D. Thus, the occupants sitting on the rear seats 20C and 20D are imaged by the camera 4B.

The cameras 4A and 4B transmit, to the control device 1, video data with which it is possible to identify which one of the cameras 4A and 4B has taken the video. For example, each of the cameras 4A and 4B associates camera identification information for identifying the camera itself with video data, and transmits the video data to the control device 1.

Note that the number of and installation positions of the cameras 4 provided in the vehicle space 210 are not limited to the example of FIG. 2. The installation position of the camera 4 can be a position where a body part (typically, an upper body) to be imaged of an occupant to be imaged can be imaged, and for example, the camera 4A can be provided near a part between a steering wheel and the glove box. In a case where a camera with a small imaging range is used, it is possible to provide four cameras 4 in front of the respective seats. For example, in a case where the camera 4A provided near a part between the steering wheel and the glove box can image parts to be imaged of the occupants sitting on the rear seats 20C and 20D, it is not necessary to provide the camera 4B in the vehicle 200.

In the example illustrated in FIG. 2, the microphones 5A through 5D are provided in front of the respective seats while sound collection units thereof are oriented to face the respective seat. Specifically, the microphone 5A is provided near the steering wheel in front of the driver's seat 20A while a sound collection unit thereof is oriented to face the driver's seat 20A. The microphone 5B is provided near the glove box in front of the passenger's seat 20B while a sound collection unit thereof is oriented to face the passenger's seat 20B. The microphone 5C is provided on the back side of the driver's seat 20A in front of the rear seat 20C while a sound collection unit thereof is oriented to face the rear seat 20C. The microphone 5D is provided on the back side of the passenger's seat 20B in front of the rear seat 20D while a sound collection unit thereof is oriented to face the rear seat 20D.

Each of the microphones 5A through 5D in accordance with Embodiment 1 has directivity in its sound collection range so as to collect only audio emitted by an occupant sitting on a seat to which the sound collection unit thereof is oriented. Specifically, each of the microphones 5A through 5D has high sound collection sensitivity in a range from the sound collection unit to the seat to which the sound collection unit is oriented (i.e., in front of the sound collection unit), and has low sound collection sensitivity in the other ranges. Thus, the microphone 5A collects only audio emitted by the occupant sitting on the driver's seat 20A among the occupants in the vehicle 200. The microphone 5B collects only audio emitted by the occupant sitting on the passenger's seat 20B among the occupants in the vehicle 200. The microphone 5C collects only audio emitted by the occupant sitting on the rear seat 20C among the occupants in the vehicle 200. The microphone 5C collects only audio emitted by the occupant sitting on the rear seat 20D among the occupants in the vehicle 200.

Each of the microphones 5A through 5D transmits, to the control device 1, an audio signal with which it is possible to identify which one of the microphones 5A through 5D has collected the audio. For example, each of the microphones 5A through 5D associates microphone identification information for identifying the microphone itself with an audio signal, and transmits the audio signal to the control device 1.

Note that the number of and installation positions of the microphones 5 provided in the vehicle space 210 are not limited to the example of FIG. 2. For example, as long as a direction in which audio is emitted can be identified, it is possible to provide one microphone that has a sound collection range covering the entire vehicle space 210 at an appropriate position in the vehicle 200 (e.g., the position of the point O in FIG. 2). In the example of FIG. 2, in order to indicate the correspondence between the microphone 5 and the seat, the microphones 5 are provided in front of the respective seats. However, the microphone 5 is preferably provided at a position at which the microphone 5 does not collect sound of audio outputted by the directional speaker 3 but corrects only sound of an utterance by the occupant sitting on each of the seats.

The audio sources 2 in the example of FIG. 2 include an information terminal that can be brought into the vehicle space 210, and an on-vehicle audio source which is installed in advance in the vehicle space 210. Specific examples of the on-vehicle audio source include, but are not limited to, an on-vehicle radio, an on-vehicle television, a car audio device, and the like.

In Embodiment 1, it is assumed that the control device 1 is provided in the vehicle 200. An installation position of the control device 1 in the vehicle 200 is not particularly limited as long as the control device 1 can be communicably connected with the audio sources 2, the directional speakers 3, the cameras 4, and the microphones 5. Note that, as long as the control device 1 can be communicably connected with the audio sources 2, the directional speakers 3, the cameras 4, and the microphones 5, the control device 1 can be provided at a position different from the vehicle 200. For example, the control device 1 can be provided in a server device on a network that is communicably connected to the vehicle 200.

(Details of Control Device 1)

With reference to FIG. 1 again, details of the control device 1 will be described. The control device 1 includes a video recognition unit 11, an audio recognition unit 12, a detection unit 13, an identification unit 14, an output control unit 15, a storage unit 16, and a communication unit 17. Hereinafter, an example will be described in which the audio output system 100 in accordance with Embodiment 1 is applied to the vehicle 200 illustrated in FIG. 2. That is, in the following description, a user of the audio output system 100 is an occupant in the vehicle 200.

The storage unit 16 stores various kinds of data used by the control device 1. As illustrated in FIG. 1, the storage unit 16 stores at least an audio source setting 161. The storage unit 16 can be implemented as an external storage device accessible by the control device 1.

The communication unit 17 receives information from an information terminal that operates as an audio source 2. An example of the information is information on an orientation of the information terminal (hereinafter referred to as "orientation information"). The orientation information will be described later. The communication unit 17 can have a function to transmit information to the information terminal. The communication unit 17 can transmit/receive information to/from an audio source 2 other than the information terminal.

The video recognition unit 11 carries out a process of recognizing a video taken by the camera 4. The video recognition unit 11 includes a motion recognition unit 111, a sight line recognition unit 112, and a terminal recognition unit 113. The video recognition unit 11 outputs, to the detection unit 13, a recognition result of the video together with camera identification information associated with the obtained video data.

The motion recognition unit 111 recognizes a motion of a body part of an occupant that appears on the video. The motion of the body part can be recognized by using a conventional technique, and therefore detailed descriptions thereof are omitted here. For example, the motion recognition unit 111 recognizes a motion of a body part of an occupant using a motion inference model for inferring the motion of the body part from video data on which the body part appears. The motion inference model can be stored in the storage unit 16.

The sight line recognition unit 112 recognizes a line of sight of an occupant appearing on a video, that is, a direction in which the occupant is looking at. The line of sight can be recognized by using a conventional technique, and therefore detailed descriptions thereof are omitted here. For example, the sight line recognition unit 112 recognizes a line of sight of an occupant using a sight line inference model for inferring the line of sight from video data on which the eye appears. The sight line inference model can be stored in the storage unit 16 or in another device communicably connected to the control device 1.

The terminal recognition unit 113 recognizes a motion and an orientation of an information terminal that appears on a video. These recognitions by the information terminal can be achieved by using a conventional technique, and therefore detailed descriptions thereof are omitted here. For example, the terminal recognition unit 113 recognizes the motion and orientation of the information terminal using a terminal inference model for inferring a motion and an orientation of an information terminal from video data on which the information terminal appears. The terminal inference model can be stored in the storage unit 16 or in another device communicably connected to the control device 1.

The terminal recognition unit 113 can recognize an orientation of an information terminal on the basis of orientation information received in real time from the information terminal via the communication unit 17. The orientation information is at least one of inertia information and radio field intensity information. The inertia information is, for example, information measured by an inertial sensor provided in an information terminal. Examples of the inertial sensor include, but are not limited to, a 3-axis acceleration sensor, a 3-axis angular velocity sensor, a 3-axis orientation sensor, and a 9-axis sensor including a combination thereof. The radio field intensity information is information indicating a signal strength (received signal strength indicator (RSSI)) of a wireless connection such as a Bluetooth connection.

The cameras 4 have functions necessary for recognition of a motion of a body part, recognition of a line of sight, and recognition of a motion and an orientation of an information terminal. For example, in a case where an infrared image is needed to recognize a line of sight, the camera 4 has a function as an infrared camera.

The audio recognition unit 12 carries out an audio recognition process for audio that has been collected by the microphone 5. Specifically, the audio recognition unit 12 converts an audio signal obtained from the microphone 5 into text data, and outputs the text data to the detection unit 13. The audio recognition process can be carried out by using a conventional technique, and therefore detailed descriptions thereof are omitted here. For example, the audio recognition unit 12 carries out the audio recognition process using an audio recognition model. The audio recognition model includes an acoustic model, a pronunciation dictionary, and a linguistic model. The audio recognition unit 12 inputs an acoustically analyzed audio signal into the audio recognition model to obtain a recognition result, i.e., text data converted from the audio signal. The audio recognition model can be generated by a conventional deep learning technique. The audio recognition model can be stored in the storage unit 16 or in another device communicably connected to the control device 1.

Based on the text data obtained as the audio recognition result, the audio recognition unit 12 determines whether or not the collected audio is an utterance. In a case where the audio is determined to be an utterance, the audio recognition unit 12 outputs the text data to the detection unit 13 together with microphone identification information associated with the obtained audio signal. In a case where the audio is determined not to be an utterance, the audio recognition unit 12 terminates the process without outputting the text data to the detection unit 13. Note that the audio recognition unit 12 can obtain a result of determination as to whether or not audio is an utterance from the audio recognition model, as well as from the audio recognition result. In other words, the determination as to whether or not audio is an utterance can be made by the audio recognition model. Examples of audio that is not an utterance include, but are not limited to, noise generated in the vehicle space 210, and the like.

The above described "another device communicably connected to the control device 1" can be implemented as, for example, a cloud server.

The detection unit 13 detects a sharing initiation speech/ motion of an occupant present in an output destination space of the directional speaker 3. The output destination space is a space in which the directional speaker 3 outputs audio. That is, the detection unit 13 in accordance with Embodiment 1 detects a sharing initiation speech/motion of an occupant present in the vehicle space 210.

The detection unit 13 detects a predetermined action of an occupant as the sharing initiation speech/motion from an image captured by the camera 4. The predetermined action is at least a part of the sharing initiation speech/motion. Specifically, the detection unit 13 determines, based on a recognition result which is of a video taken by the camera 4 and is obtained from the video recognition unit 11, whether or not the predetermined action of the occupant is carried out in the video. In a case where the detection unit 13 has determined that the predetermined action is being carried out, the detection unit 13 outputs the obtained recognition result and camera identification information to the identification unit 14. Meanwhile, in a case where the detection unit 13 has determined that the predetermined action is not being carried out, the detection unit 13 terminates the process of detecting the sharing initiation speech/motion. Specific examples of the predetermined action detected by the detection unit 13 will be described later.

The detection unit 13 detects a predetermined utterance given by the occupant as the sharing initiation speech/motion from audio inputted into the microphone 5. The predetermined utterance is at least a part of the sharing initiation speech/motion. Specifically, the detection unit 13 determines, based on text data which has been obtained from the audio recognition unit 12 and is a recognition result of audio inputted into the microphone 5, whether or not the audio is the predetermined utterance. In a case where the detection unit 13 has determined that the audio is the predetermined utterance, the detection unit 13 outputs the obtained text data and microphone identification information to the identification unit 14. Meanwhile, in a case where the detection unit 13 has determined that the audio is not the predetermined utterance, the detection unit 13 terminates the process of detecting the sharing initiation speech/motion. Specific examples of the predetermined utterance detected by the detection unit 13 will be described later.

In Embodiment 1, it is assumed that the sharing initiation speech/motion is constituted by a plurality of predetermined actions (excluding an utterance) carried out in a predetermined order, or is constituted by a plurality of predetermined utterances (excluding a motion) given in a predetermined order. In other words, the detection unit 13 outputs, to the identification unit 14, the recognition result of the video and camera identification information or the audio recognition result (text data) and microphone identification information. Note that the "predetermined order" means that a predetermined action or a predetermined utterance for initiating audio sharing is carried out first, and then a predetermined action or a predetermined utterance for accepting the audio sharing is carried out.

The identification unit 14 identifies an audio source of interest among the audio sources 2 and a directional speaker 3 to be controlled, in accordance with the detected sharing initiation speech/motion. The identification unit 14 includes an audio source identification unit 141 and a speaker identification unit 142.

The audio source identification unit 141 identifies the audio source of interest in accordance with the detected sharing initiation speech/motion. Specifically, the audio source identification unit 141 obtains the recognition result of the video and camera identification information or the audio recognition result (text data) and microphone identification information from the detection unit 13, and identifies the audio source of interest based on the obtained data and the audio source setting 161 stored in the storage unit 16.

FIG. 3 is a diagram illustrating a specific example of the audio source setting 161. The audio source setting 161 is information indicating a combination of an audio source 2 and a directional speaker 3 outputting audio supplied from the audio source 2. In FIG. 3, the audio source setting 161 is a database in a table form. However, a data format of the audio source setting 161 is not limited to this example.

FIG. 3 illustrates audio source settings 161A and 161B as examples of the audio source setting 161. The audio source setting 161A is the audio source setting 161 before the identification unit 14 carries out the process. The audio source setting 161B is the audio source setting 161 after the identification unit 14 carries out the process.

In a "speaker" column, information indicating the directional speakers 3 provided in the vehicle space 210 is stored. In the example of FIG. 3, pieces of information indicating the respective directional speakers 3A through 3D are stored in respective records. Hereinafter, the information stored in the "speaker" column is sometimes referred to as "speaker information". In an "audio source" column, information indicating the audio sources 2 that supply pieces of audio outputted by the directional speakers 3 is stored. Hereinafter, the information stored in the "audio source" column is sometimes referred to as "audio source information".

According to the audio source setting 161A, the directional speaker 3A is outputting audio supplied from the audio source 2A, which is an on-vehicle radio. The directional speaker 3B is outputting audio supplied from the audio source 2B, which is a portable gaming machine. The directional speaker 3C is outputting audio supplied from the audio source 2C, which is a smart phone. The directional speaker 3D is outputting audio supplied from the audio source 2D, which is a smart phone. Note that a "sharing control" column and a "pre-sharing audio source" column will be described later.

With reference to FIG. 1 again, the audio source identification unit 141 will be described. First, a case will be described in which an occupant has carried out a sharing initiation speech/motion constituted by a predetermined action, and thus the identification unit 14 obtains a recognition result of a video and camera identification information. Based on the obtained camera identification information, the audio source identification unit 141 identifies a camera 4 that has taken the video. Subsequently, the audio source identification unit 141 identifies, based on the identification result of the camera 4 and the recognition result of the video, a space in which the occupant who has initiated the sharing initiation speech/motion is present. That is, this space is an output destination space of a directional speaker 3 outputting audio that the occupant who has initiated the sharing initiation speech/motion is listening to. In Embodiment 1, the audio source identification unit 141 identifies the space by identifying a seat on which the occupant who has initiated the sharing initiation speech/motion sits. Next, the audio source identification unit 141 identifies, based on the identification result of the seat, a directional speaker 3 that is provided in the seat. Subsequently, the audio source identification unit 141 identifies, based on the identification result of the directional speaker 3 and the audio source setting 161, an audio source 2 that is set for the directional speaker 3.

For example, in a case where an occupant sitting on the rear seat 20D is the user who has initiated the sharing initiation speech/motion, and an occupant sitting on the rear seat 20C is the user who has established the sharing initiation speech/motion, the audio source identification unit 141 identifies that the camera 4B has taken the video, and identifies that the occupant that is the user who has initiated the sharing initiation speech/motion is sitting on the rear seat 20D. Subsequently, the audio source identification unit 141 identifies the directional speaker 3D that is provided in the rear seat 20D, and identifies the audio source 2D that is set for the directional speaker 3D based on the audio source setting 161A.

Next, a case will be described in which an occupant has carried out a sharing initiation speech/motion constituted by a predetermined utterance, and thus the identification unit 14 obtains an audio recognition result and microphone identification information. Based on the obtained microphone identification information, the audio source identification unit 141 identifies a microphone 5 that has collected the audio. Next, the audio source identification unit 141 identifies, based on the identification result of the microphone 5 and the audio recognition result, a seat on which the occupant who has initiated the sharing initiation speech/motion sits, and thus identifies a space in which the occupant is present. Next, the audio source identification unit 141 identifies, based on the identification result of the seat, a directional speaker 3 that is provided in the seat. Subsequently, the audio source identification unit 141 identifies, based on the identification result of the directional speaker 3 and the audio source setting 161, an audio source 2 that is set for the directional speaker 3.

For example, in a case where an occupant sitting on the rear seat 20D is the user who has initiated the sharing initiation speech/motion, and an occupant sitting on the rear seat 20C is the user who has established the sharing initiation speech/motion, the audio source identification unit 141 identifies that the microphone 5C and the microphone 5D have collected the audio, and identifies that the occupant that is the user who has initiated the sharing initiation speech/motion is sitting on the rear seat 20D. Subsequently, the audio source identification unit 141 identifies the directional speaker 3D that is provided in the rear seat 20D, and identifies the audio source 2D that is set for the directional speaker 3D based on the audio source setting 161A.

The speaker identification unit 142 identifies a directional speaker 3 to be controlled, in accordance with the detected sharing initiation speech/motion. Specifically, the speaker identification unit 142 obtains the recognition result of the video and camera identification information or the audio recognition result and microphone identification information from the detection unit 13, and identifies a directional speaker 3 to be controlled based on the obtained data.

First, a case will be described in which an occupant has carried out a sharing initiation speech/motion constituted by a predetermined action, and thus the identification unit 14 obtains a recognition result of a video and camera identification information. Based on the obtained camera identification information, the speaker identification unit 142 identifies a camera 4 that has taken the video. Subsequently, the speaker identification unit 142 identifies, based on the identification result of the camera 4 and the recognition result of the video, a seat on which the occupant who is the user who has established the sharing initiation speech/motion sits. That is, the speaker identification unit 142 identifies, from among occupants in the video, an occupant who has carried out a predetermined action for accepting sharing, and then identifies a seat on which the occupant is sitting. Next, the speaker identification unit 142 identifies, based on the identification result of the seat, a directional speaker 3 that is provided in the seat as an object to be controlled.

For example, in a case where an occupant sitting on the rear seat 20D is the user who has initiated the sharing initiation speech/motion, and an occupant sitting on the rear seat 20C is the user who has established the sharing initiation speech/motion, the speaker identification unit 142 identifies that the camera 4B has taken the video, and identifies that the occupant that is the user who has established the sharing initiation speech/motion is sitting on the rear seat 20C. Next, the speaker identification unit 142 identifies the directional speaker 3C that is provided in the rear seat 20C as an object to be controlled.

Next, a case will be described in which an occupant has carried out a sharing initiation speech/motion constituted by a predetermined utterance, and thus the identification unit 14 obtains an audio recognition result and microphone identification information. Based on the obtained microphone identification information, the speaker identification unit 142 identifies a microphone 5 that has collected the audio. Subsequently, the speaker identification unit 142 identifies, based on the identification result of the microphone 5 and the audio recognition result, a seat on which the occupant who is the user who has established the sharing initiation speech/motion sits. That is, the speaker identification unit 142 identifies an occupant who has given a predetermined utterance for accepting sharing, and then identifies a seat on which the occupant is sitting. Next, the speaker identification unit 142 identifies, based on the identification result of the seat, a directional speaker 3 that is provided in the seat as an object to be controlled.

For example, in a case where an occupant sitting on the rear seat 20D is the user who has initiated the sharing initiation speech/motion, and an occupant sitting on the rear seat 20C is the user who has established the sharing initiation speech/motion, the speaker identification unit 142 identifies that the microphone 5C and the microphone 5D have collected the audio, and identifies that the occupant that is the user who has established the sharing initiation speech/motion is sitting on the rear seat 20C. Next, the speaker identification unit 142 identifies the directional speaker 3C that is provided in the rear seat 20C as an object to be controlled.

The identification unit 14 updates the "audio source" column of the audio source setting 161 based on the identified audio source 2 and directional speaker 3. For example, in a case where the occupant sitting on the rear seat 20D is the user who has initiated the sharing initiation speech/motion and the occupant sitting on the rear seat 20C is the user who has established the sharing initiation speech/motion, the audio source 2D and the directional speaker 3C are identified as described above. Based on the identification result, the identification unit 14 changes the audio source 2C associated with the directional speaker 3C in the audio source setting 161A to the audio source 2D as shown in the audio source setting 161B. The identification unit 14 notifies the output control unit 15 of the update of the audio source setting 161.

The identification unit 14 updates the "sharing control" column and the "pre-sharing audio source" column of the audio source setting 161. In the "sharing control" column, a flag is stored which indicates whether or not the directional speaker 3 is identified as an object to be controlled. In the example of FIG. 3, "0" is a flag indicating that the directional speaker 3 is not identified as an object to be controlled, and "1" is a flag indicating that the directional speaker 3 is identified as an object to be controlled. However, the flag which indicates whether or not the directional speaker 3 is identified as an object to be controlled is not limited to this example. Hereinafter, the flag is sometimes referred to as "sharing control flag".

For example, in a case where the occupant sitting on the rear seat 20D is the user who has initiated the sharing initiation speech/motion and the occupant sitting on the rear seat 20C is the user who has established the sharing initiation speech/motion, the identification unit 14 changes the sharing control flag from "0" to "1" in the record containing speaker information of the directional speaker 3C.

In the "pre-sharing audio source" column, information is stored which indicates an audio source 2 that was set, immediately before initiation of the control, for the directional speaker 3 identified by the identification unit 14 as an object to be controlled. That is, when a directional speaker 3 to be controlled has been identified by the identification unit 14, audio source information, which was stored in the "audio source" column before this identification, is stored in the "pre-sharing audio source" column. Hereinafter, the information stored in the "pre-sharing audio source" column is sometimes referred to as "pre-sharing audio source information".

For example, in a case where the occupant sitting on the rear seat 20D is the user who has initiated the sharing initiation speech/motion and the occupant sitting on the rear seat 20C is the user who has established the sharing initiation speech/motion, pre-sharing audio source information indicating the audio source 2C is stored in the record containing speaker information of the directional speaker 3C. In addition, pre-sharing audio source information indicating the audio source 2D is stored in the record containing speaker information of the directional speaker 3D.

In a case where no audio source 2 is set, immediately before initiation of the control, for a directional speaker 3 identified by the identification unit 14 as an object to be controlled, pre-sharing audio source information is not stored in a record containing speaker information of that directional speaker 3.

Further, in the example of the audio source setting 161B illustrated in FIG. 3, the directional speaker 3A is not identified as an object to be controlled in the record containing speaker information of the directional speaker 3A, and the directional speaker 3B is not identified as an object to be controlled in the record containing speaker information of the directional speaker 3B. Therefore, the identification unit 14 does not update pre-sharing audio source information for these records.

The output control unit 15 causes audio supplied from an audio source 2 to be outputted from any of the directional speakers 3, based on the audio source setting 161. That is, the output control unit 15 causes audio supplied from an audio source 2, which has been identified by the identification unit 14, to be outputted from each of directional speakers 3 identified by the identification unit 14. In the example of the audio source setting 161B illustrated in FIG. 3, upon receipt of a notification from the identification unit 14, the output control unit 15 refers to the audio source setting 161B, and causes audio supplied from the audio source 2D to be outputted not only from the directional speaker 3D but also from the directional speaker 3C. Thus, the audio supplied from the audio source 2D is shared between the occupants sitting on the respective rear seats 20C and 20D.

Note that a method of causing audio supplied from an audio source 2 identified by the identification unit 14 to be outputted from a directional speaker 3 identified by the identification unit 14 is not particularly limited. For example, it is possible that the output control unit 15 cancels current pairing of the directional speaker 3 and an audio source 2, and pairs the identified audio source 2 with the identified directional speaker 3. Alternatively, for example, it is possible that the output control unit 15 causes audio supplied from the identified audio source 2 to be outputted from the identified directional speaker 3 by transmitting audio data from a directional speaker 3 with which the identified audio source 2 is paired to the identified directional speaker 3.

(Flow of Sharing Process)

Figure 4:
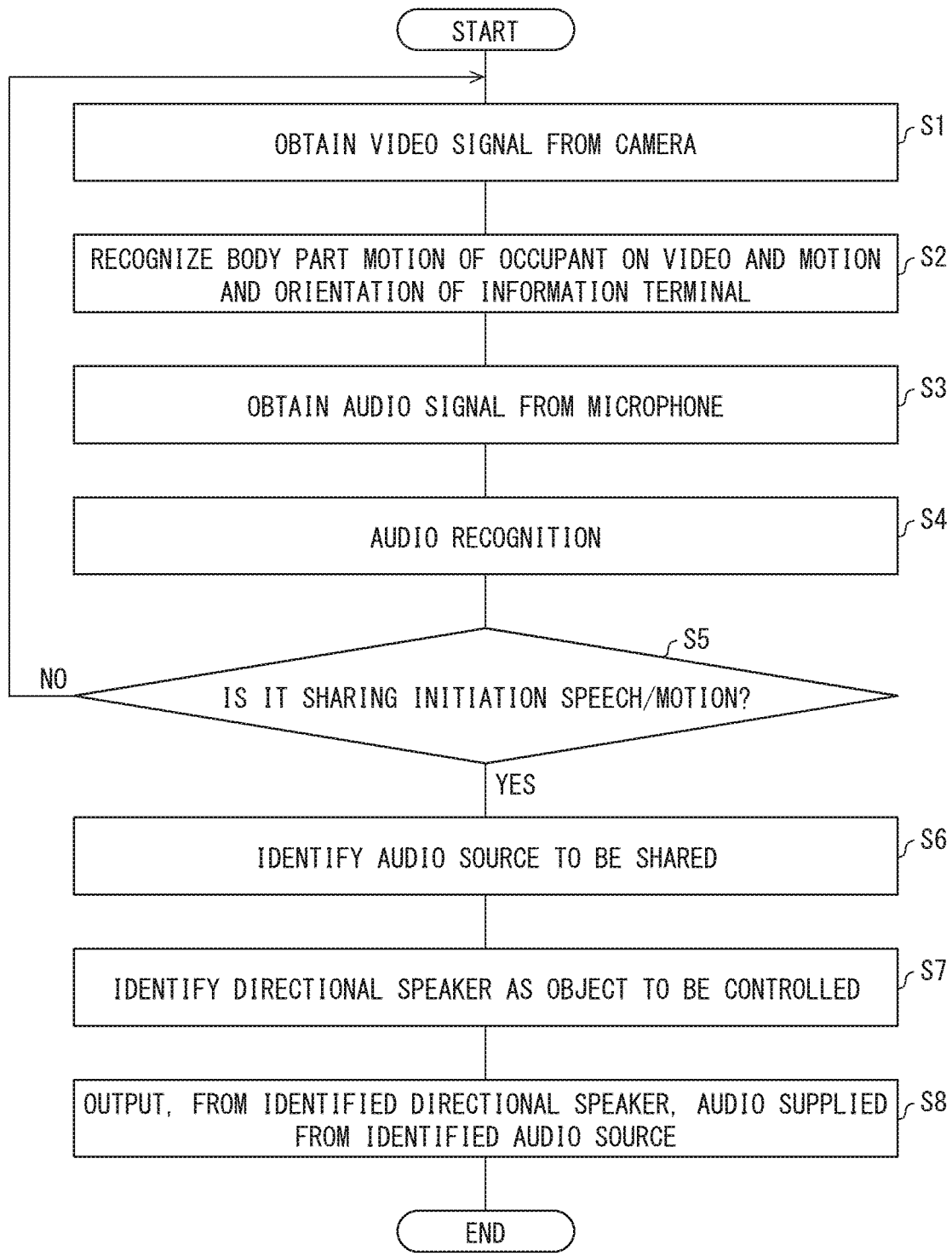
FIG. 4 is a flowchart showing an example of a flow of a sharing process carried out by the control device illustrated in FIG. 1.

FIG. 4 is a flowchart showing an example of a flow of a sharing process carried out by the control device 1. In a step S1, the video recognition unit 11 obtains video data from the camera 4. In a step S2, the video recognition unit 11 recognizes a motion of a body part of an occupant appearing on the video and a motion and an orientation of an information terminal. The motion of the body part includes a motion of a line of sight of the occupant. The video recognition unit 11 outputs, to the detection unit 13, a result of this recognition process and camera identification information which is associated with the obtained video data.

In a step S3, the audio recognition unit 12 obtains an audio signal from the microphone 5. In a step S4, the audio recognition unit 12 carries out audio recognition and utterance determination. In a case where the audio recognition unit 12 has determined that audio indicated by the obtained audio signal is an utterance, the audio recognition unit 12 outputs, to the detection unit 13, the audio recognition result and microphone identification information which is associated with the obtained audio signal.

In a step S5 (detection step), the detection unit 13 detects a sharing initiation speech/motion. The detection unit 13 determines, based on the obtained recognition result of the video and the obtained audio recognition result, whether or not the sharing initiation speech/motion has been carried out. In a case where the detection unit 13 has determined that the sharing initiation speech/motion has been carried out (YES in the step S5), the detection unit 13 outputs, to the identification unit 14, the obtained recognition result of the video and the obtained camera identification information, or the audio recognition result and microphone identification information. Then, the sharing process proceeds to a step S6. In a case where the detection unit 13 has determined that the sharing initiation speech/motion has not been carried out (NO in the step S5), the sharing process returns to the step S1.

In the step S6 (identification step), the audio source identification unit 141 identifies an audio source 2 to be shared. Specifically, the identification unit 14 identifies such an audio source 2 based on the data obtained from the detection unit 13 and the audio source setting 161.

In a step S7 (identification step), the speaker identification unit 142 identifies a directional speaker 3 to be controlled. Specifically, the speaker identification unit 142 identifies the directional speaker 3 based on the data obtained from the detection unit 13. The identification unit 14 updates the audio source setting 161 based on the identified audio source 2 and the identified directional speaker 3, and notifies the output control unit 15 of the update.

In a step S8 (output control step), the output control unit 15 causes the identified directional speaker 3 to output audio supplied from the identified audio source 2. Specifically, upon receipt of the notification from the identification unit 14, the output control unit 15 refers to the audio source setting 161. In the audio source setting 161, the identified audio source 2 is associated with the identified directional speaker 3 by the update of the audio source setting 161. Therefore, the output control unit 15 can cause the identified directional speaker 3 to output audio supplied from the identified audio source 2. Thus, the sharing process is completed.

In a case where audio has not been generated in the vehicle space 210, the processes of the steps S3 and S4 are omitted. In a case where the audio recognition unit 12 has determined in the step S4 that audio generated in the vehicle space 210 is not an utterance, the audio recognition unit 12 does not transmit the audio recognition result and microphone identification information to the detection unit 13.

(Specific Example 1 of Sharing Initiation Speech/Motion)

Figure 5:
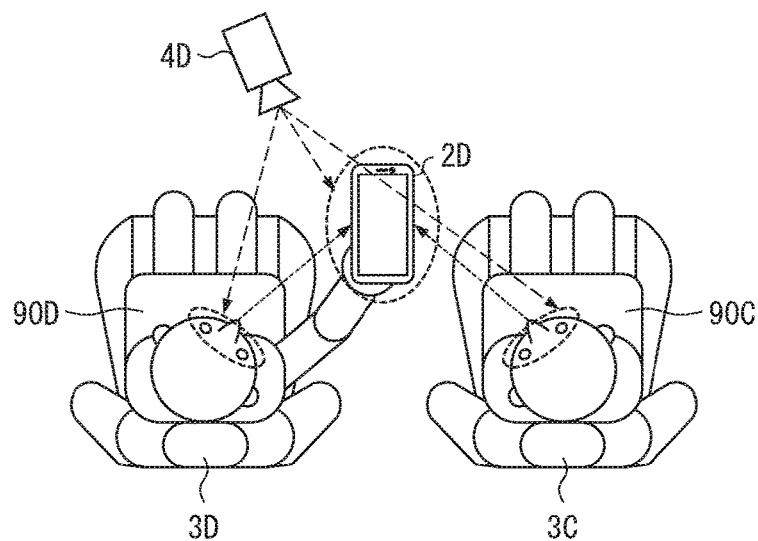
FIG. 5 is a diagram illustrating a specific example of a sharing initiation speech/motion carried out in a vehicle space.

FIG. 5 is a diagram illustrating a specific example of a sharing initiation speech/motion carried out in the vehicle space 210. The sharing initiation speech/motion illustrated in FIG. 5 is constituted by a predetermined action, and includes a motion of a body part of an occupant, which is to move a position of an information terminal operating as an audio source 2 in a predetermined path. Specifically, the sharing initiation speech/motion illustrated in FIG. 5 is constituted by predetermined actions below. The audio source 2D illustrated in FIG. 5 is a smart phone having a display unit. (1) An occupant 90D present in an output destination space of the directional speaker 3D for which the audio source 2D is set brings the audio source 2D closer to an occupant 90C present in an output destination space of the directional speaker 3C for which the audio source 2D is not set. (2) The occupant 90D looks at a display unit of the audio source 2D. (3) The occupant 90C looks at the display unit of the audio source 2D.

Here, the output destination spaces of the directional speakers 3C and 3D are formed in the rear seats 20C and 20D, respectively. The order of the predetermined actions (2) and (3) is not particularly limited, as long as those actions are carried out after the predetermined action (1).

The detection unit 13 detects a sharing initiation speech/motion by detecting the following items from a recognition result of a video. (A) A motion of the hand of the occupant 90D holding the audio source 2D is a motion of approaching the occupant 90C. (B) The display unit of the audio source 2D is facing the occupants 90C and 90D. (C) Lines of sight of the occupants 90C and 90D are directed to the audio source 2D.

The detection unit 13 detects the above item (A) from a recognition result by the motion recognition unit 111 and a recognition result by the terminal recognition unit 113 (i.e., a result of recognizing a motion of the information terminal). The detection unit 13 detects the above item (B) from a recognition result by the terminal recognition unit 113 (i.e., a result of recognizing an orientation of the information terminal). The detection unit 13 detects the above item (C) from a recognition result of the sight line recognition unit 112.

In a case where all of the above items (A) through (C) have been detected, the detection unit 13 determines that the sharing initiation speech/motion has been detected, and outputs the recognition result of the video and camera identification information to the identification unit 14. Meanwhile, in a case where any one of the items (A) through (C) has not been detected, the detection unit 13 determines that the sharing initiation speech/motion has not been detected, and does not output the detection result of the video and camera identification information to the identification unit 14. For example, in a case where the line of sight of the occupant 90C is not directed to the audio source 2D, the detection unit 13 does not output the recognition result of the video and camera identification information to the identification unit 14. In a case where all of the items (A) through (C) have been detected, the identification unit 14 identifies, based on the recognition result of the video and camera identification information, an audio source 2 of interest and a directional speaker 3 to be controlled. Meanwhile, in a case where any one of the items (A) through (C) has not been detected, the identification unit 14 does not identify an audio source 2 of interest and a directional speaker 3 to be controlled. That is, in a case where (i) the occupant 90D has brought the audio source 2D closer to the occupant 90C while the display unit of the audio source 2D is facing the occupant 90D and (ii) the line of sight of the occupant 90C is directed to the audio source 2D, the identification unit 14 identifies an audio source 2 of interest and a directional speaker 3 to be controlled. Meanwhile, in a case where the line of sight of the occupant 90C is not directed to the audio source 2D, the identification unit 14 does not identify an audio source 2 of interest and a directional speaker 3 to be controlled.

The predetermined actions constituting the sharing initiation speech/motion are not limited to the predetermined actions (1) through (3) above. For example, the predetermined action can be only the actions (1) and (3) above. That is, the predetermined action does not need to include the action in which the occupant 90D looks at the display unit of the information terminal. In this case, the detection unit 13 detects the following actions (B') and (C') instead of the actions (B) and (C) above. (B') The display unit of the audio source 2D is facing the occupant 90D. (C') It is detected that the line of sight of the occupant 90D is directed to the audio source 2D.

Alternatively, the action (2) above in the predetermined actions constituting the sharing initiation speech/motion can be an action of looking at something/someone other than the information terminal. For example, the action (2) can be an action in which the occupant 90D looks at the occupant 90C. In this example, the detection unit 13 detects the actions (A) and (B') and detects that the line of sight of the occupant 90D is directed to the occupant 90C.

The sharing initiation speech/motion illustrated in FIG. 5 is actions by the occupants 90C and 90D in which the occupant 90D who is listening to audio supplied from the audio source 2D via the directional speaker 3D recommends the occupant 90C to listen to the audio, and the occupant 90C accepts the recommendation. In other words, the occupants in the vehicle 200 can share audio by causing, with general actions for sharing audio among a plurality of persons, audio supplied from the same audio source 2 to be outputted by the directional speakers 3 provided in the seats on which the respective occupants are present. As a result, the occupants in the vehicle 200 can achieve audio sharing without an input operation with respect to a user interface for audio sharing, and this makes it possible to achieve audio sharing without feeling troublesomeness of the input operation.

(Specific Example 2 of Sharing Initiation Speech/Motion)

Figure 6:
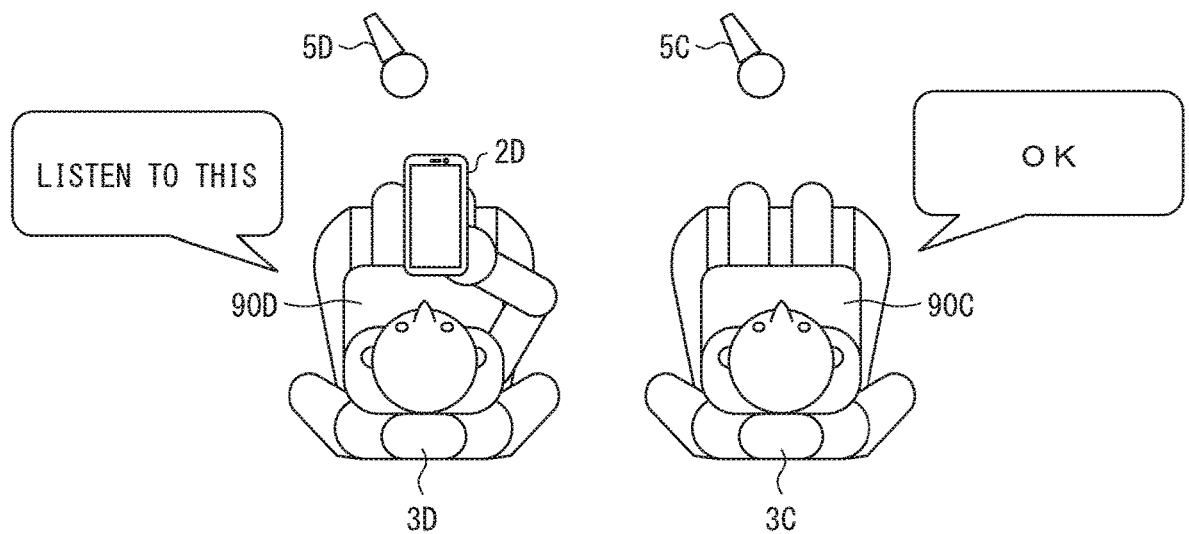
FIG. 6 is a diagram illustrating another specific example of a sharing initiation speech/motion carried out in a vehicle space.

FIG. 6 is a diagram illustrating another specific example of a sharing initiation speech/motion carried out in the vehicle space 210. In the specific example illustrated in FIG. 6, parts identical with those in the specific example illustrated in FIG. 5 have already been described, and therefore such parts will not be repeated here.

The sharing initiation speech/motion illustrated in FIG. 6 is constituted by a predetermined utterance, and the predetermined utterance includes an utterance indicating an intention to provide an audio source and an utterance of an affirmative response to said utterance. Specifically, the sharing initiation speech/motion illustrated in FIG. 6 is constituted by predetermined utterances below. (4) The occupant 90D gives an utterance "Listen to this" for providing an audio source. (5) The occupant 90C (second user) gives an affirmative utterance (response) "OK".

The detection unit 13 detects the sharing initiation speech/motion by detecting, from the audio recognition result, an utterance indicating an intention to provide an audio source and an utterance of an affirmative response to said utterance.

The utterance indicating the intention to provide an audio source and the utterance of the affirmative response to said utterance are not limited to the example in FIG. 6. That is, the detection unit 13 can detect a plurality of variations of the utterance indicating the intention to provide an audio source and the utterance of the affirmative response to said utterance. The detection unit 13, for example, refers to texts indicating the respective variations stored in the storage unit 16, and detects an utterance indicating an intention to provide an audio source and an utterance of an affirmative response to said utterance.

In a case where the detection unit 13 has detected both the utterance indicating the intention to provide an audio source and the utterance of the affirmative response to said utterance, the detection unit 13 determines that the detection unit 13 has detected a sharing initiation speech/motion, and outputs the audio recognition result and microphone identification information to the identification unit 14. Meanwhile, in a case where any one of those utterances has not been detected, the detection unit 13 determines that the sharing initiation speech/motion has not been detected, and does not output the audio recognition result and microphone identification information to the identification unit 14. For example, in a case where an utterance given by the occupant 90C is an utterance of a negative response to the utterance "Listen to this" by the occupant 90D, the detection unit 13 does not output the audio recognition result and microphone identification information to the identification unit 14. Examples of the utterance of a negative response include, but are not limited to, "I'd rather not", "Sorry", "I don't want to listen", and the like.

(Specific Example 3 of Predetermined Speech/Motion)

Figure 7:
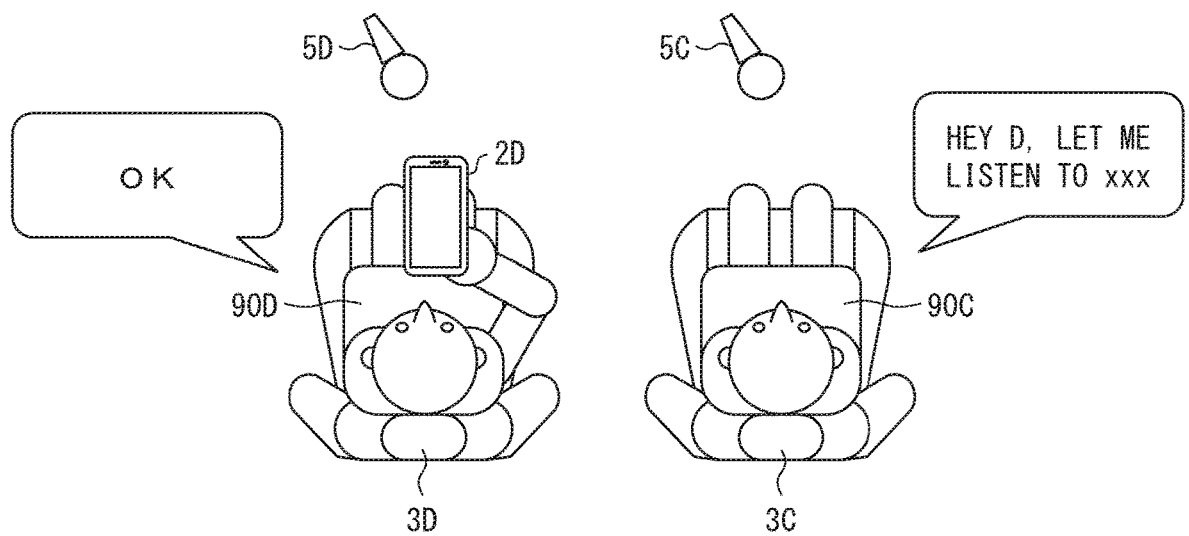
FIG. 7 is a diagram illustrating yet another specific example of a sharing initiation speech/motion carried out in a vehicle space.

FIG. 7 is a diagram illustrating yet another specific example of a sharing initiation speech/motion carried out in the vehicle space 210. In the specific example illustrated in FIG. 7, parts identical with those in the specific examples illustrated in FIGS. 5 and 6 have already been described, and therefore such parts will not be repeated here.

The sharing initiation speech/motion illustrated in FIG. 7 is constituted by a predetermined utterance, and the predetermined utterance includes an utterance indicating a request for enjoyment of an audio source and an utterance of an affirmative response to said utterance. Specifically, the sharing initiation speech/motion illustrated in FIG. 7 is constituted by predetermined utterances below. (6) The occupant 90C gives an utterance "Hey D, let me listen to xxx" as a request for enjoyment of an audio source. (7) The occupant 90D (third user) gives an affirmative utterance (response) "OK".

The detection unit 13 detects a sharing initiation speech/motion by detecting, from the audio recognition result, an utterance indicating a request for enjoyment of an audio source and an utterance of an affirmative response to said utterance. The utterance indicating the request for enjoyment of an audio source and the utterance of the affirmative response to said utterance are not limited to the example in FIG. 7. That is, the detection unit 13 can detect a plurality of variations of the utterance indicating the request for enjoyment of an audio source and the utterance of the affirmative response to said utterance. The detection unit 13, for example, refers to texts indicating the respective variations stored in the storage unit 16, and detects an utterance indicating a request for enjoyment of an audio source and an utterance of an affirmative response to said utterance.

In a case where the detection unit 13 has detected both the utterance indicating the request for enjoyment of an audio source and the utterance of the affirmative response to said utterance, the detection unit 13 determines that a sharing initiation speech/motion has been detected, and outputs the audio recognition result and microphone identification information to the identification unit 14. Meanwhile, in a case where any one of those utterances has not been detected, the detection unit 13 determines that the sharing initiation speech/motion has not been detected, and does not output the audio recognition result and microphone identification information to the identification unit 14. For example, in a case where an utterance given by the occupant 90D is an utterance of a negative response to the utterance "Hey D, let me listen to xxx" by the occupant 90C, the detection unit 13 does not output the audio recognition result and microphone identification information to the identification unit 14. Examples of the utterance of a negative response include, but are not limited to, "I'd rather not", "Sorry", and the like.

As in Specific Examples 2 and 3, the occupants in the vehicle 200 can share audio by causing, with general conversation carried out when sharing audio among a plurality of persons, the directional speakers 3 provided in the seats on which the respective occupants are present to output audio supplied from the same audio source 2. As a result, the occupants in the vehicle 200 can achieve audio sharing without an input operation with respect to a user interface, and this makes it possible to achieve audio sharing without feeling troublesomeness of the input operation.

(Variation)

In the above described embodiment, audio supplied from the audio source 2 is outputted from the directional speaker 3 via the control device 1. However, audio supplied from the audio source 2 can be outputted directly from the directional speaker 3 without involvement of the control device 1. For example, the directional speaker 3 can be directly connected to any of the audio sources 2 by Bluetooth and output audio supplied from the audio source 2. This connection can be established without involvement of the control device 1. However, it is preferable that any one of the audio source 2 and the directional speaker 3 transmits, to the control device 1, information indicating this connection, i.e., information indicating the pairing of the audio source 2 with the directional speaker 3.

The output control unit 15 in this example gives an instruct to at least one of an audio source 2 identified by the identification unit 14, a directional speaker 3 connected to said audio source 2 prior to identification, and a directional speaker 3 identified by the identification unit 14 so that audio supplied from said audio source 2 is also outputted from the directional speaker 3 identified by the identification unit 14.

In the above described embodiment, the sharing initiation speech/motion is constituted by only a predetermined action or only a predetermined utterance. However, the sharing initiation speech/motion can also be constituted by a predetermined action and a predetermined utterance. For example, the sharing initiation speech/motion can be constituted by an utterance indicating an intention to provide an audio source or a request for enjoyment of an audio source, and an action to affirmatively respond to said utterance. In this example, the detection unit 13 outputs, to the identification unit 14, the recognition result of the video and camera identification information and the audio recognition result and microphone identification information.

The identification unit 14 identifies an audio source 2 of interest from, for example, an audio recognition result and microphone identification information. Further, the identification unit 14 identifies a directional speaker 3 to be controlled from, for example, a recognition result of a video and camera identification information. Details of those identifications are described in Embodiment 1, and the descriptions thereof will not be repeated here.

The sharing initiation speech/motion can be an action or an utterance by a single user. For example, in a case where the occupant 90D has made an action to bring the audio source 2D closer to the occupant 90C, the detection unit 13 can detect only this action as the sharing initiation speech/motion. In other words, a speech/motion for acceptance can be omitted.

The identification unit 14 can identify a directional speaker 3 to be controlled, based on content of an utterance of the user. For example, in a case where a word "everyone" is included in an audio recognition result which indicates an utterance indicating a request for enjoyment of an audio source, the identification unit 14 can identify, as an object to be controlled, all directional speakers 3 other than a directional speaker 3 set for the audio source 2 of interest. In this example, the detection unit 13 can detect, for example, a speech/motion including an utterance "Everyone, listen to this" as a sharing initiation speech/motion.

Alternatively, the detection unit 13 can detect only an utterance "Everyone, listen to this" as a sharing initiation speech/motion. In this example, it is possible that the identification unit 14 identifies whether or not occupants are sitting on the respective seats of the vehicle 200, and identifies, as an object to be controlled, one or more directional speakers 3 which are not a directional speaker 3 that is set for an audio source 2 of interest and which are provided in the seats on which the occupants are sitting. The identification unit 14 can identify whether or not an occupant is seated, for example, based on measurement data of a weight sensor that is provided on a seating face of the seat.

In a case where an audio source 2 of interest is an information terminal, the output control unit 15 can measure, in real time, radio field intensity of Bluetooth connecting the audio source 2 with a directional speaker 3 identified as an object to be controlled and, carry out control in accordance with the radio field intensity.

For example, the output control unit 15 can lower (fade out) a volume of audio outputted from the directional speaker 3 to be controlled, in response to a decrease in radio field intensity. That is, the output control unit 15 lowers a volume of audio outputted from the directional speaker 3 to be controlled, in response to an increase in distance between the information terminal and the directional speaker 3. When the distance between the information terminal and the directional speaker 3 becomes a distance with which connection by Bluetooth is not available, the connection by Bluetooth is cancelled, and audio supplied from the information terminal cannot be outputted from the directional speaker 3. This configuration allows the control device 1 to naturally terminate audio output in accordance with the disconnection between the information terminal and the directional speaker 3.

In a case where the connection by Bluetooth between the audio source 2 of interest and the directional speaker 3 identified as an object to be controlled is cancelled, the output control unit 15 preferably causes the storage unit 16 to store the combination of the audio source 2 and the directional speaker 3. Then, in a case where the measured radio field intensity becomes equal to or higher than predetermined intensity, the output control unit 15 can reconnect the information terminal, which is the disconnected audio source 2, to the directional speaker 3 by referring to the stored combination. Thus, sharing of audio supplied from the information terminal is resumed. After the information terminal has been reconnected to the directional speaker 3, the output control unit 15 can increase (fade in) a volume of audio outputted from the directional speaker 3 to be controlled, in response to an increase in radio field intensity. This configuration allows the control device 1 to naturally resume audio output in accordance with the reconnection between the information terminal and the directional speaker 3.

The audio output system 100 can include a plurality of speakers each of which does not have directivity, instead of the plurality of directional speakers 3.

The control device 1 can carry out, by a natural language processing, the processes from detection of a predetermined utterance to identification of an audio source 2 of interest and a directional speaker 3 to be controlled. In this example, the control device 1 can use, in order to implement the natural language processing, an inference model trained to infer an audio source 2 of interest and a directional speaker 3 to be controlled when a particular word is included in an utterance. Moreover, in this example, members for obtaining an audio recognition result, inputting the result into the inference model, and identifying an audio source 2 and a directional speaker 3 based on the inference result correspond to the detection unit 13 and the identification unit 14.

Note that the above Variation is applicable to embodiments described below.

Embodiment 2

The following description will discuss another embodiment of the present invention. Note that, for convenience of explanation, members identical in function to those described in Embodiment 1 are given identical reference numerals, and descriptions of those members will not be repeated.

In a case where a control device 1 in accordance with Embodiment 2 has detected a second predetermined speech/motion indicating termination by a user, the control device 1 terminates output of audio, which is supplied from an identified audio source, from each of directional speakers sharing the audio source. Hereafter, the second predetermined speech/motion is referred to as "sharing termination speech/motion".

Specifically, the detection unit 13 detects the sharing termination speech/motion, in addition to a predetermined speech/motion described in Embodiment 1. The sharing termination speech/motion can be, for example, a predetermined action (hereinafter, referred to as "second predetermined action") in which both arms are crossed to form "x", or a predetermined utterance (hereinafter, referred to as "second predetermined utterance") including a word such as "end".

In the former example, in a case where the detection unit 13 has detected a second predetermined action from a recognition result of a video, the detection unit 13 determines that the sharing termination speech/motion has been detected, and outputs the recognition result of the video and camera identification information to the identification unit 14. In the latter example, in a case where the detection unit 13 has detected a second predetermined utterance from an audio recognition result, the detection unit 13 determines that the sharing termination speech/motion has been detected, and outputs microphone identification information to the identification unit 14.

In response to the detected sharing termination speech/motion, the identification unit 14 causes each of directional speakers 3 identified on the basis of the sharing initiation speech/motion to terminate output of audio supplied from an audio source identified on the basis of the sharing initiation speech/motion.

First, a case will be described in which an occupant has carried out a sharing termination speech/motion constituted by a second predetermined action, and thus the identification unit 14 obtains a recognition result of a video and camera identification information. Based on the obtained camera identification information, the identification unit 14 identifies a camera 4 that has taken the video. Next, the identification unit 14 identifies, based on the identification result of the camera 4 and the recognition result of the video, a seat on which the occupant who has carried out the sharing termination speech/motion sits, and thus identifies a space in which the occupant who has carried out the sharing termination speech/motion is present. Next, the identification unit 14 identifies, based on the identification result of the seat, a directional speaker 3 that is provided in the seat. Subsequently, the identification unit 14 identifies, based on the identification result of the directional speaker 3 and the audio source setting 161, an audio source 2 that is supplying the audio outputted from the directional speaker 3. Next, the identification unit 14 determines, based on the identification result of the audio source 2 and the audio source setting 161, whether or not there is another directional speaker 3 outputting audio supplied from the identified audio source 2.

In a case where the identification unit 14 has determined that there is said another directional speaker 3, the identification unit 14 causes each of directional speakers 3 identified on the basis of the sharing initiation speech/motion to terminate output of audio supplied from an audio source 2 identified on the basis of the sharing initiation speech/motion. These directional speakers 3 are, in other words, directional speakers 3 for each of which the sharing control flag is set to 1. The identification unit 14 outputs, to the output control unit 15, a termination instruction to terminate audio output from the directional speakers 3 for each of which the sharing control flag is set to 1 in the audio source setting 161. The termination instruction includes speaker information of the directional speakers 3 and pre-sharing audio source information in a record containing the speaker information.

The identification unit 14 updates the audio source setting 161. Specifically, the identification unit 14 updates audio source information, a sharing control flag, and pre-sharing audio source information for a record containing speaker information related to the termination instruction. More specifically, the identification unit 14 deletes current audio source information, and moves pre-sharing audio source information to an "audio source" cell. As a result, the cell of "pre-sharing audio source" becomes blank. Moreover, the identification unit 14 changes the sharing control flag to "0".

The output control unit 15 terminates current audio output from the directional speakers 3 for which the termination instruction has been given and, for each of the identified directional speakers 3, resets an audio source 2 which was set immediately before initiation of control by the output control unit 15. That is, the output control unit 15 initiates audio output from the audio source 2 indicated by the termination instruction. As a result, the occupants in the vehicle 200 can listen to respective pieces of audio again that were listened to immediately before the sharing, after the sharing of audio supplied from the audio source 2 of interest is terminated.

For example, it is possible that the output control unit 15 gradually lowers a volume of current audio output of the directional speakers 3 indicated by the termination instruction and, when the volume becomes equal to or smaller than a predetermined volume, the output control unit 15 initiates audio output from the audio source 2 indicated by the termination instruction, and gradually increases the volume until the volume becomes equal to or greater than a second predetermined volume which is different from the predetermined volume. It is preferable that the second predetermined volume is greater than the predetermined volume. This configuration allows, in a natural manner, the occupants in the vehicle 200 to listen to respective pieces of audio again that were listened to immediately before the sharing of audio supplied from the audio source 2.

Next, a case will be described in which an occupant has carried out a sharing termination speech/motion constituted by a second predetermined utterance, and consequently the identification unit 14 obtains microphone identification information. Based on the obtained microphone identification information, the identification unit 14 identifies a microphone 5 that has collected the audio. Next, the identification unit 14 identifies, based on the identification result of the microphone 5, a seat on which the occupant who has carried out the sharing termination speech/motion sits, and thus identifies a space in which the occupant who has carried out the sharing termination speech/motion is present. The microphones 5 and the seats correspond to each other one-to-one. Therefore, the identification unit 14 can identify an occupant who has given the second predetermined utterance by identifying a microphone 5 that has collected sound of the second predetermined utterance. The subsequent processes are identical with those carried out when a recognition result of a video and camera identification information are obtained as described above, and therefore descriptions thereof will not be repeated here.

In a case where the identification unit 14 has determined that there is no other directional speaker 3 outputting audio supplied from the identified audio source 2, the identification unit 14 does not output a termination instruction to the output control unit 15. The case where the identification unit 14 has determined that there is no other directional speaker 3 is, for example, a case where an occupant present in an output destination space of a directional speaker 3, which is not outputting audio supplied from the audio source 2 of interest, has carried out the sharing termination speech/motion.

(Flow of Sharing Termination Process)

FIG. 8 is a flowchart showing an example of a flow of a sharing termination process carried out by the control device 1. In the flowchart shown in FIG. 8, steps for carrying out process identical with those of the sharing process described in Embodiment 1 are denoted by the same step numbers. Moreover, such steps have already been described in Embodiment 1, and are therefore not described here.

In a step S11, the detection unit 13 detects a sharing termination speech/motion. The detection unit 13 determines whether or not the sharing termination speech/motion has been carried out based on the obtained recognition result of the video and the obtained audio recognition result. In a case where the detection unit 13 has determined that the sharing termination speech/motion has been carried out (YES in the step S11), the detection unit 13 outputs, to the identification unit 14, the obtained recognition result of the video and the obtained camera identification information, or microphone identification information. Then, the sharing process proceeds to a step S12. In a case where the detection unit 13 has determined that the sharing termination speech/motion has not been carried out (NO in the step S11), the sharing process returns to the step S1.

In a step S12, the identification unit 14 identifies an audio source 2 to which a directional speaker 3 sharing the audio source was connected immediately before the sharing. The identification unit 14 outputs a termination instruction including information indicating the identified audio source 2 to the output control unit 15.

In a step S13, the output control unit 15 causes each directional speaker 3 to output audio supplied from the audio source 2 which has been identified. That is, the directional speaker 3 identified by the identification unit 14 as an object to be controlled terminates output of audio supplied from the audio source 2 which has been identified by the identification unit 14, and initiates output of audio supplied from another audio source 2 which was set immediately before the sharing.

(Variation)

The process of the output control unit 15 carried out when the sharing termination speech/motion has been carried out is not limited to the process of outputting audio supplied from an audio source 2 indicated by pre-sharing audio source information. For example, the output control unit 15 can be configured to carry out only the process of disconnecting the audio source 2 of interest from the directional speaker 3, that is, to prevent the directional speaker 3 from outputting audio after the sharing is terminated.

Embodiment 3

The following description will discuss yet another embodiment of the present invention. Note that, for convenience of explanation, members identical in function to those described in Embodiments 1 and 2 are given identical reference numerals, and descriptions of those members will not be repeated.

A control device 1 in accordance with Embodiment 3 controls audio output based on an eyelid opening value indicating a degree of opening of an eyelid of each occupant.

For example, the control device 1 allows audio supplied from an audio source 2 which has been identified by the identification unit 14 to be shared only with an occupant whose eyelid opening value has been detected to be equal to or greater than a predetermined value. Specifically, the identification unit 14 identifies an eyelid opening value from a recognition result of a video taken by the camera 4, and compares the eyelid opening value with the predetermined value. Then, the identification unit 14 excludes, from an object to be controlled, a directional speaker 3 that is provided for an occupant, whose eyelid opening value is less than the predetermined value, to listen to audio.

For example, in a case where a word "everyone" is included in an audio recognition result of a sharing initiation speech/motion, the identification unit 14 identifies eyelid opening values of respective occupants in the vehicle 200 from recognition results of videos. In a case where there is an occupant whose eyelid opening value is less than the predetermined value, the identification unit 14 identifies, from camera identification information, a seat on which the occupant sits, and identifies a directional speaker 3 that is provided in the seat. Then, the identification unit 14 excludes this directional speaker 3 from an object to be controlled.

As such, the control device 1 can exclude an occupant whose eyelid opening value is less than the predetermined value, in other words, an occupant who is sleeping or is trying to sleep, from an occupant to share audio supplied from an audio source 2 which has been identified by the identification unit 14. Therefore, it is possible to reduce a possibility that audio supplied from an audio source 2 is listened to by an occupant who does not wish to share the audio.

The control using the eyelid opening value is not limited to this example. For example, it is possible that the control device 1 measures in real time an eyelid opening value of an occupant present in an output destination space of a directional speaker 3 which has been identified as an object to be controlled, and controls audio output from the directional speaker 3.

For example, the identification unit 14 continuously obtains a recognition result of a video of an occupant in the vehicle 200 present in an output destination space of a directional speaker 3 identified to be controlled, until the directional speaker 3 is no longer an object to be controlled. In a case where the identification unit 14 has identified, from the recognition result of the video, that an occupant's eyelid opening value is less than a predetermined value, the identification unit 14 lowers the volume of the directional speaker 3, with which the occupant listens to audio, to a predetermined value. This allows the control device 1 to avoid disturbing the occupant's sleeping.

[Example of Configuration Achieved by Software]

The functions of the control device 1 (hereinafter, referred to as "device") can be realized by a program for causing a computer to function as the device, the program causing the computer to function as the control blocks of the device (in particular, the video recognition unit 11, the audio recognition unit 12, the detection unit 13, the identification unit 14, the output control unit 15, and the communication unit 17).

In this case, the device includes a computer that has at least one control device (e.g., a processor) and at least one storage device (e.g., a memory) as hardware for executing the program. By executing the program with the control device and the storage device, the functions described in the above embodiments are realized.

The program can be stored in one or more non-transitory computer-readable storage mediums. The storage medium can be provided in the device, or the storage medium does not need to be provided in the device. In the latter case, the program can be supplied to the device via an arbitrary wired or wireless transmission medium.

One or some or all of the functions of the control blocks can be realized by a logic circuit. For example, an integrated circuit in which a logic circuit that functions as the control blocks is formed is also encompassed in the scope of the present invention. Other than those, for example, it is possible to realize the functions of the control blocks by a quantum computer.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Control device
2, 2A through 2N: Audio source
3, 3A through 3N: Directional speaker (audio output device)
4, 4A, 4B: Camera (imaging device)
5, 5A through 5D: Microphone (audio input device)
13: Detection unit
14: Identification unit
15: Output control unit S5: Detection step
S6: Identification step
S7: Identification step
S8: Output control step

The invention claimed is:

1. A control device for causing a plurality of audio output devices to output audio supplied from any of one or more audio sources, each of the one or more audio sources being set for each of the plurality of audio output devices, said control device comprising:
   a detection unit that detects a predetermined speech/motion of a user who is present in an output destination space of any of the plurality of audio output devices;
   an identification unit that identifies, in accordance with the predetermined speech/motion which has been detected, an audio source of interest among the one or more audio sources and one or more audio output devices as an object to be controlled among the plurality of audio output devices; and
   an output control unit that causes each of the one or more audio output devices which have been identified to output audio supplied from the audio source of interest which has been identified.

2. The control device as set forth in claim 1, wherein the detection unit detects, from an image captured by an imaging device, a predetermined action of the user as the predetermined speech/motion.

3. The control device as set forth in claim 2, wherein the detection unit detects the predetermined action on the basis of a motion of a body part of the user included in the image.

4. The control device as set forth in claim 3, wherein:
   the motion of the body part includes a motion of moving a position of an information terminal, which operates as an audio source, along a predetermined path; and
   the identification unit identifies the information terminal as the audio source of interest.

5. The control device as set forth in claim 4, wherein:
   the predetermined path is a path along which the information terminal is moved from a side of a user who is present in an output destination space of an audio output device for which the information terminal is set as an audio source to a side of a user who is present in an output destination space of an audio output device for which the information terminal is not set as an audio source; and
   the identification unit identifies the audio output device, for which the information terminal is not set as an audio source, as the object to be controlled.

6. The control device as set forth in claim 5, wherein:
   the detection unit detects a line of sight of the user toward which the information terminal has been moved;
   in a case where the line of sight is directed to the information terminal, the identification unit identifies the audio source of interest and the object to be controlled; and
   in a case where the line of sight is not directed to the information terminal, the identification unit does not identify the audio source of interest and the object to be controlled.

7. The control device as set forth in claim 1, wherein the detection unit detects, from audio inputted into an audio input device, a predetermined utterance given by the user as the predetermined speech/motion.

8. The control device as set forth in claim 2, wherein the detection unit detects, from audio inputted into an audio input device, a predetermined utterance given by the user as the predetermined speech/motion.

9. The control device as set forth in claim 3, wherein the detection unit detects, from audio inputted into an audio input device, a predetermined utterance given by the user as the predetermined speech/motion.

10. The control device as set forth in claim 4, wherein the detection unit detects, from audio inputted into an audio input device, a predetermined utterance given by the user as the predetermined speech/motion.

11. The control device as set forth in claim 5, wherein the detection unit detects, from audio inputted into an audio input device, a predetermined utterance given by the user as the predetermined speech/motion.

12. The control device as set forth in claim 6, wherein the detection unit detects, from audio inputted into an audio input device, a predetermined utterance given by the user as the predetermined speech/motion.

13. The control device as set forth in claim 7, wherein:
   the predetermined utterance includes an intention to provide an audio source;
   the detection unit detects, after the predetermined utterance has been given, a speech/motion of a second user who is different from the user who has given the predetermined utterance;
   in a case where the speech/motion is affirmative, the identification unit identifies, as the audio source of interest, an audio source of audio that is outputted to a space in which the user who has given the predetermined utterance is present, and the identification unit at least identifies, as the object to be controlled, an audio output device that outputs audio to a space in which the second user is present; and
   in a case where the speech/motion is negative, the identification unit does not identify the audio source of interest and the object to be controlled.

14. The control device as set forth in claim 7, wherein:
   the predetermined utterance includes a request for enjoyment of an audio source;
   the detection unit detects, after the predetermined utterance has been given, a speech/motion of a third user who is different from the user who has given the predetermined utterance;
   in a case where the speech/motion is affirmative, the identification unit identifies, as the audio source of interest, an audio source of audio that is outputted to a space in which the third user is present, and the identification unit at least identifies, as the object to be controlled, an audio output device that outputs audio to a space in which the user who has given the predetermined utterance is present; and
   in a case where the speech/motion is negative, the identification unit does not identify the audio source of interest and the object to be controlled.

15. The control device as set forth in claim 13, wherein:
   the predetermined utterance includes a request for enjoyment of an audio source;
   the detection unit detects, after the predetermined utterance has been given, a speech/motion of a third user who is different from the user who has given the predetermined utterance;
   in a case where the speech/motion is affirmative, the identification unit identifies, as the audio source of interest, an audio source of audio that is outputted to a space in which the third user is present, and the identification unit at least identifies, as the object to be controlled, an audio output device that outputs audio to a space in which the user who has given the predetermined utterance is present; and in a case where the speech/motion is negative, the identification unit does not identify the audio source of interest and the object to be controlled.

16. The control device as set forth in claim 1, wherein:
the detection unit detects a second predetermined speech/motion of the user, the second predetermined speech/motion being different from the predetermined speech/motion and indicating termination; and in a case where the second predetermined speech/motion has been detected, the output control unit causes the one or more audio output devices which have been identified to terminate output of audio supplied from the audio source of interest which has been identified.

17. The control device as set forth in claim 16, wherein, in accordance with the termination, the output control unit resets an audio source, which had been set immediately before initiation of control by the output control unit, for each of the one or more audio output devices which have been identified.

18. The control device as set forth in claim 1, wherein:
each of the plurality of audio output devices has directivity in a direction in which audio is emitted; and the plurality of audio output devices are arranged such that no sound field is formed by pieces of audio outputted and reached from the plurality of audio output devices which are different from each other.

19. A method for controlling audio output by a control device that causes a plurality of audio output devices to output audio supplied from any of one or more audio sources, each of the one or more audio sources being set for each of the plurality of audio output devices, said method comprising the steps of:

detecting a predetermined speech/motion of a user who is present in an output destination space of any of the plurality of audio output devices;

identifying, in accordance with the predetermined speech/motion which has been detected, an audio source of interest among the one or more audio sources and one or more audio output devices as an object to be controlled among the plurality of audio output devices; and causing each of the one or more audio output devices which have been identified to output audio supplied from the audio source of interest which has been identified.

20. A computer-readable storage medium which stores a control program for causing a computer to function as a control device recited in claim 1, said control program causing the computer to function as the detection unit, the identification unit, and the output control unit.

* * * * *